(12) United States Patent
Krishna et al.

(10) Patent No.: US 12,271,617 B2
(45) Date of Patent: Apr. 8, 2025

(54) REVERSE GARBAGE COLLECTION PROCESS FOR A STORAGE DEVICE

(71) Applicant: SANDISK TECHNOLOGIES, INC., San Jose, CA (US)

(72) Inventors: Dharmaraju Marenahally Krishna, Bengaluru (IN); Anantharaj Thalaimalai Vanaraj, San Jose, CA (US); Abhilash Ettigi, Bengaluru (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/359,228

(22) Filed: Jul. 26, 2023

(65) Prior Publication Data

US 2024/0377979 A1 Nov. 14, 2024

Related U.S. Application Data

(60) Provisional application No. 63/501,531, filed on May 11, 2023.

(51) Int. Cl.
*G06F 3/06* (2006.01)

(52) U.S. Cl.
CPC .......... *G06F 3/0652* (2013.01); *G06F 3/0616* (2013.01); *G06F 3/0659* (2013.01); *G06F 3/0679* (2013.01)

(58) Field of Classification Search
CPC .... G06F 3/0616; G06F 3/0652; G06F 3/0659; G06F 3/0679
See application file for complete search history.

(56) References Cited

U.S. PATENT DOCUMENTS

| | | | |
|---|---|---|---|
| 11,593,262 B1 * | 2/2023 | Henze | G06F 12/0238 |
| 2011/0138100 A1 * | 6/2011 | Sinclair | G06F 12/0246 |
| | | | 711/E12.082 |
| 2022/0300184 A1 * | 9/2022 | Yang | G06F 3/0616 |
| 2024/0062823 A1 * | 2/2024 | Zhou | G11C 16/102 |

* cited by examiner

*Primary Examiner* — Larry T MacKall
(74) *Attorney, Agent, or Firm* — DENTONS Durham Jones Pinegar

(57) ABSTRACT

A memory device includes a number of different memory dies and/or planes. One or more host operations, such as write operations and/or read operations, are performed on each memory die and/or plane in sequence. For example, from memory die 0 to memory die n. A garbage collection process is performed in parallel with the host operations. However, the garbage collection process is performed in a reverse order when compared with the order of the host operations. For example, the garbage collection process is performed from memory die n to memory die 0.

20 Claims, 10 Drawing Sheets

REVERSE GARBAGE COLLECTION PROCESS FOR A STORAGE DEVICE

CROSS-REFERENCE TO RELATED APPLICATIONS

The present application claims priority to U.S. Provisional Application 63/501,531 entitled "REVERSE GARBAGE COLLECTION PROCESS FOR A STORAGE DEVICE", filed May 11, 2023, the entire disclosure of which is hereby incorporated by reference in its entirety.

BACKGROUND

Non-volatile storage devices, such as NAND flash memory, are used in a variety of electronic devices. Examples include solid-state-drives (SSDs), smartphones, tablets, memory cards, USB flash drives and the like. In order to achieve sustained performance over the lifetime of the non-volatile storage device, various operations, such as garbage collection operations, need to be periodically performed. During garbage collection operations, valid data from a memory block that is to be erased is transferred to a new memory block. Once the data has been transferred, the old memory block may be erased.

In some examples, garbage collection operations are intermixed with host operations (e.g., data reads and/or data writes). For example, host operations may be performed on the non-volatile storage device followed by garbage collection operations. When the first set of garbage collection operations are complete, a second set of host operations may be performed. However, intermixing host operations with garbage collection operations may negatively impact the performance of the non-volatile storage device. For example, over time and/or as the non-volatile storage device stores more data, a speed of read operations and/or write operations of the non-volatile storage device may decrease.

Accordingly, it would be beneficial for a non-volatile storage device to perform garbage collection operations and host operations in a manner that would maintain or substantially maintain performance capabilities of the non-volatile storage over its lifetime.

SUMMARY

The present application describes a process for performing garbage collection operations in parallel with one or more host operations. Although garbage collection operations are specifically mentioned, the examples described herein may be applicable to a number of different operations including, but not limited to, a combination of program and read operations or a combination of erase and read operations.

As will be explained in more detail herein, the garbage collection operations may be performed in reverse (or in a reverse flow) from the host operations that are performed on the non-volatile storage device. For example, the non-volatile memory device may be a NAND storage device that includes a number of memory dies and/or planes. One or more host operations (e.g., a write operation or a read operation) may be performed on each memory die and/or plane sequentially (e.g., from memory die 0 to memory die n). However, the garbage collection operations may be performed in a reverse order (e.g., from memory die n to memory die 0). In an example, the garbage collection operations may be performed in parallel with the host operations.

Accordingly, the present application describes a method that includes receiving, from a host device, a set of operations for a non-volatile storage device. In an example, the non-volatile storage device includes a plurality of storage elements having a specified order for performing the set of operations. The set of operations is performed on a first subset of the plurality of storage elements in the specified order. While the set of operations are being performed on the first subset of the plurality of storage elements in the specified order, a plurality of non-similar operations are being performed on a second subset of the plurality of storage elements. In an example, the plurality of non-similar operations are performed on the second subset of the plurality of storage elements in an order that is reversed from the specified order.

The present application also describes a data storage device. The data storage device includes a controller, n number of storage elements having a specified programming order from a first storage element to a n storage element, and a memory communicatively coupled to the controller. The memory stores instructions that, when executed by the controller, perform operations. In an example, the operations include providing operations to the first storage element to a n−1 storage element and causing the operations to be executed on the first storage element to the n−1 storage element. While the operations are being executed on the first storage element to the n−1 storage element, initiating a first garbage collection operation on the n storage element. Upon completion of the operations being executed on the first storage element to the n−1 storage element and upon completion of the first garbage collection operation on the n storage element, the operations are executed on the n storage element to a n−2 storage element. Additionally, while the operations are executed on the n storage element to the n−2 storage element, a second garbage collection operation is performed on the n−1 storage element.

Also described is a non-volatile storage device that includes a controller means and n number of storage means. In an example, n is greater than two. The non-volatile storage device also includes means for providing a first set of operations to a first storage means of the n number of storage means to a n−1 storage means of the n number of storage means and means for causing the first set of operations to be executed on the first storage means to the n−1 storage means. The non-volatile storage device also includes means for causing a second set of operations to be executed on a n storage means of the n number of storage means while the first set of operations are being executed on the first storage means to the n−1 storage means. In an example, the second set of operations are different from the first set of operations. The non-volatile storage device also includes means for causing the first set of operations to be executed on the n storage means to a n−2 storage means of the n number of storage means upon completion of the second set of operations being executed on the n storage means. The non-volatile storage device also includes means for causing a third set of operations to be executed on the n−1 storage means while the first set of operations are being executed on the n storage means to the n−2 storage means.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
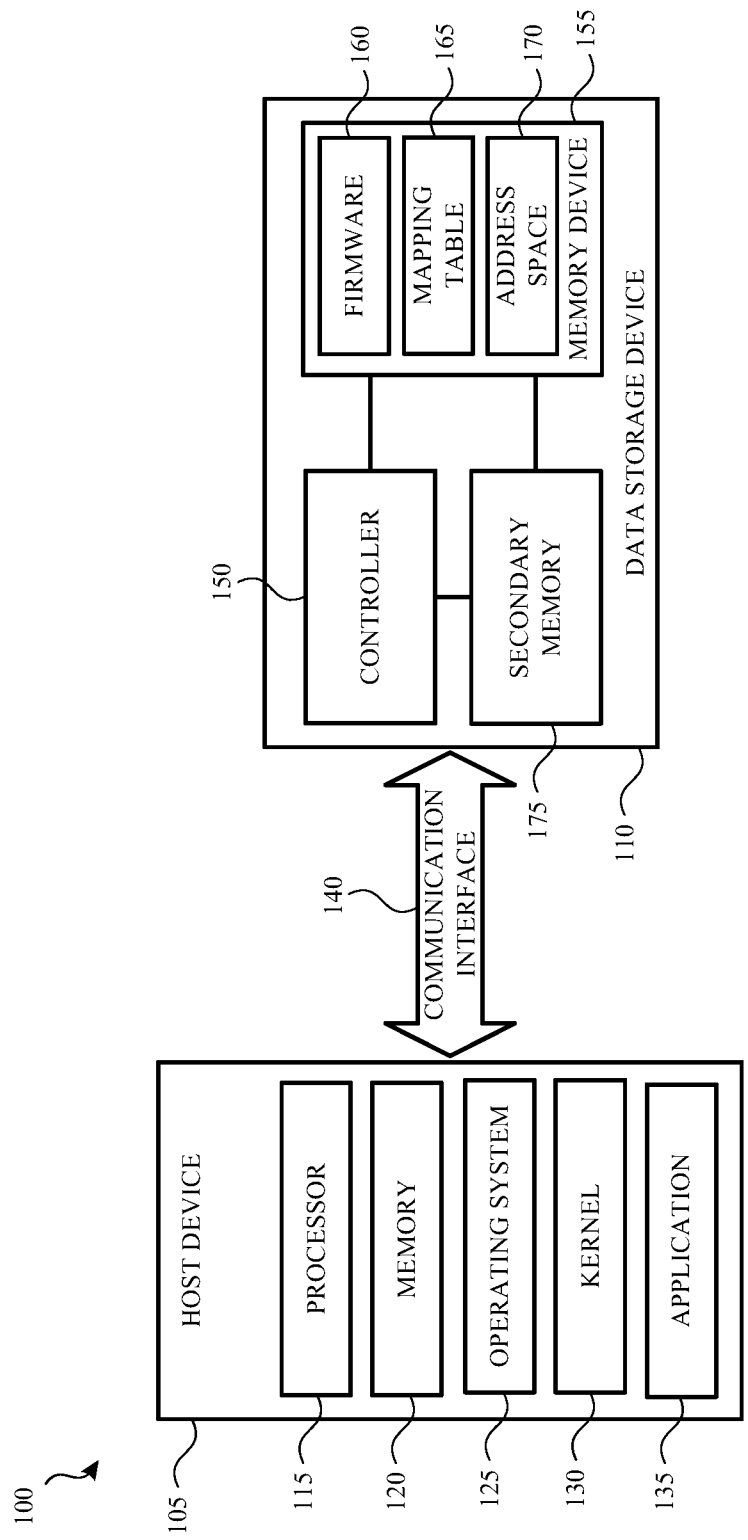
FIG. 1 is a block diagram of a system that may be used to execute the various processes described herein according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Non-volatile storage devices, such as NAND flash memory, are used in a variety of electronic devices. Examples include solid-state-drives (SSDs), smartphones, tablets, memory cards, USB flash drives and the like. It is desirable for the non-volatile storage device to maintain a consistent level of performance over an extended period of time. In order to achieve sustained performance, various background operations, such as garbage collection operations, wear leveling operations and/or bad block management operations need to be periodically performed.

In current implementations, garbage collection operations are typically intermixed with one or more host operations (e.g., data reads and/or data writes). For example, host operations may be performed on the non-volatile storage device followed by of garbage collection operations. When the garbage collection operations are complete, additional host operations may be performed. However, intermixing host operations with garbage collection operations may negatively impact the performance of the non-volatile storage device. For example, over time and/or as the non-volatile storage device stores more data, a read and/or write speed of the non-volatile storage device may decrease.

In another example, garbage collection operations are performed during an idle time of a host device associated with the non-volatile memory device. However, garbage collection operations take time and consume resources. In some examples, such as with removable non-volatile storage devices, opportunities to execute garbage collection operations may be limited—because the garbage collection process may consume too many resources and/or there is a limited amount of time during which a garbage collection operations can be performed.

In order to address the above, the present application describes performing a reverse garbage collection process on a non-volatile storage device in parallel with one or more host operations that are performed on the non-volatile storage device. For example, the non-volatile memory device may be a NAND storage device that includes a number of memory dies and/or planes. One or more host operations (e.g., a write operation and/or a read operation) may be sequentially performed on each memory die and/or plane (e.g., from memory die 0 to memory die n) while one or more garbage collection operations are being performed in a reverse order (e.g., from memory die n to memory die 0).

Accordingly, the present application describes a number of technical benefits including, but not limited to, increasing performance of non-volatile storage devices by reducing or eliminating bottlenecks that may be caused by the performance of various garbage collection operations, maintaining performance parameters of the non-volatile storage device over its lifetime, and providing a way for removable non-volatile storage devices to perform garbage collection operations without negatively impacting performance of the removable non-volatile storage device and without unduly consuming resources.

These various benefits and examples will be described in greater detail below with reference to FIG. 1-FIG. 8.

FIG. 1 is a block diagram of a system 100 that includes a host device 105 and a data storage device 110 according to an example. In an example, the host device 105 includes a processor 115 and a memory device 120 (e.g., main memory). The memory device 120 may include an operating system 125, a kernel 130 and/or an application 135.

The processor 115 can execute various instructions, such as, for example, instructions from the operating system 125 and/or the application 135. The processor 115 may include circuitry such as a microcontroller, a Digital Signal Processor (DSP), an Application-Specific Integrated Circuit (ASIC), a Field Programmable Gate Array (FPGA), hard-wired logic, analog circuitry and/or various combinations thereof. In an example, the processor 115 may include a System on a Chip (SoC).

In an example, the memory device 120 can be used by the host device 105 to store data used by the processor 115. Data stored in the memory device 120 may include instructions provided by the data storage device 110 via a communication interface 140. The data stored in the memory device 120 may also include data used to execute instructions from the operating system 125 and/or one or more applications 135. In an example, the memory 120 is volatile memory, such as, for example, Dynamic Random Access Memory (DRAM).

The operating system 125 may create a virtual address space for the application 135 and/or other processes executed by the processor 115. The virtual address space may map to locations in the memory device 120. The operating system 125 may include or otherwise be associated with a kernel 130. The kernel 130 may include instructions for managing various resources of the host device 105 (e.g., memory allocation), handling read and write requests and so on.

The communication interface 140 communicatively couples the host device 105 and the data storage device 110. The communication interface 140 may be a Serial Advanced Technology Attachment (SATA), a PCI express (PCIe) bus, a Small Computer System Interface (SCSI), a Serial Attached SCSI (SAS), Ethernet, Fibre Channel, or WiFi. As such, the host device 105 and the data storage device 110 need not be physically co-located and may communicate over a network such as a Local Area Network (LAN) or a Wide Area Network (WAN), such as the internet. In addition, the host device 105 may interface with the data storage device 110 using a logical interface specification such as Non-Volatile Memory express (NVMe), Universal Flash Storage (UFS) or Advanced Host Controller Interface (AHCI).

The data storage device 110 includes a controller 150 and a memory device 155 (e.g. volatile and/or non-volatile memory). The memory device 155 (and/or portions of the memory device 155) may also be referred to as a storage medium. The memory device 155 may include a number of storage elements. In an example, each storage element is a chip or a memory die that is used to store data.

For example, the memory device 155 may include a first memory die and a second memory die. In an example, the first memory die and the second memory die include non-volatile memory elements such as, for example, NAND flash memory elements and/or NOR flash memory elements. Although two memory dies are mentioned, the memory device 155 may include any number of storage elements. For example, the storage elements may take the form of solid-state memory such as, for example, 2D NAND, 3D NAND memory, multi-level cell memory, triple level cell memory, quad-level cell memory, penta-level cell memory or any combination thereof.

The controller 150 may include circuitry for executing instructions. The instructions may originate from firmware 160 associated with the data storage device 110. In another example, the instructions may originate from the host device 105. Accordingly, the controller 150 may include circuitry such as one or more processors, a microcontroller, a DSP, an ASIC, an FPGA, hard-wired logic, analog circuitry and/or a combination thereof. In another example, the controller 150 may include a SoC.

In an example, the controller 150 and/or the firmware 160 may initiate or otherwise control a garbage collection process that is performed on the memory device 155. Garbage collection (also referred to as a garbage collection process or garbage collection operations) is used to reclaim previously written memory blocks in the memory device 155 so the memory blocks, and its associated pages, may be rewritten with new data.

Typically, a garbage collection process involves multiple operations. For example, the controller 150 and/or the firmware 160 may identify and/or mark memory blocks that contain invalid data or that are partially filled. The controller 150 and/or the firmware 160 may move valid data from the identified or marked memory blocks to new memory blocks. The old memory blocks are subsequently erased and may be used in the future.

As will be explained in greater detail, the controller 150 and/or the firmware 160 may cause a garbage collection process to be executed in parallel with one or more host operations. For example, one or more host operations (e.g., a write operation or a read operation) may be sequentially performed on each memory die and/or plane of the memory device 155 (e.g., from memory die 0 to memory die n). However, the garbage collection operations may be performed in a reverse order (e.g., from memory die n to memory die 0).

The data storage device 110 may also include secondary memory 175. The secondary memory 175 may be a rotating magnetic disk or non-volatile solid-state memory, such as flash memory. While the description herein refers to solid-state memory generally, it is understood that solid-state memory may comprise one or more of various types of memory devices such as flash integrated circuits, NAND memory (e.g., single-level cell (SLC) memory, multi-level cell (MLC) memory (i.e., two or more levels), or any combination thereof), NOR memory, EEPROM, other discrete Non-Volatile Memory (NVM) chips, or any combination thereof.

In some examples, the memory device 155 is capable of storing data at a byte-addressable level, as opposed to other types of non-volatile memory that have a smallest writable data size such as a page size of 4 KB or a sector size of 512 Bytes.

In some examples, the memory device 155 may also store a mapping table 165 and/or an address space 170. In some examples, the controller 150 can associate portions of data stored in the secondary memory 175 with unique identifiers. The unique identifiers may be stored in the memory device 155 and be used by the operating system 125 to access stored data. For example, the mapping table 165 can provide a mapping of unique identifiers with indications of physical locations (e.g., Physical Block Addresses (PBAs)) where the corresponding portions of data are stored in the memory device 155 and/or the secondary memory 175.

As briefly discussed above, the memory device 155 may also include address space 170. The address space 170 can serve as at least a portion of an address space used by the processor 115. In an example, the address space 170 can store data at a byte-addressable level that can be accessed by the processor 115 (e.g., via the communication interface 140).

For example, the data storage device 110 may provide the host device 105 with an indication of the address space 170. The host device 105 may then associate an address range for the address space 170 and an indication that this address range is to be used as a byte-addressable address space, such as for a page cache.

In another example, the host device 105 may manage the data storage device 110 such that the processor 115 can directly access address space 170. For example, the data storage device 110 may provide logical to physical address translation information to the host device 105, which can be called by the host device 105 and executed by the processor 115 and/or the controller 150. In some examples, the controller 150 may include or otherwise be associated with a flash translation layer (FTL). The FTL may map the logical block addresses to the physical locations or PBA of the memory device 155.

Although FIG. 1 illustrates the host device 105 being separate from the data storage device 110, the host device 105 and the data storage device 110, as well the various components described, may be part of a single device or part of multiple devices. In another example, the data storage device 110 may be a removable storage device such as a USB Flash Memory Drive, a microSD card and the like.

Figure 2A:
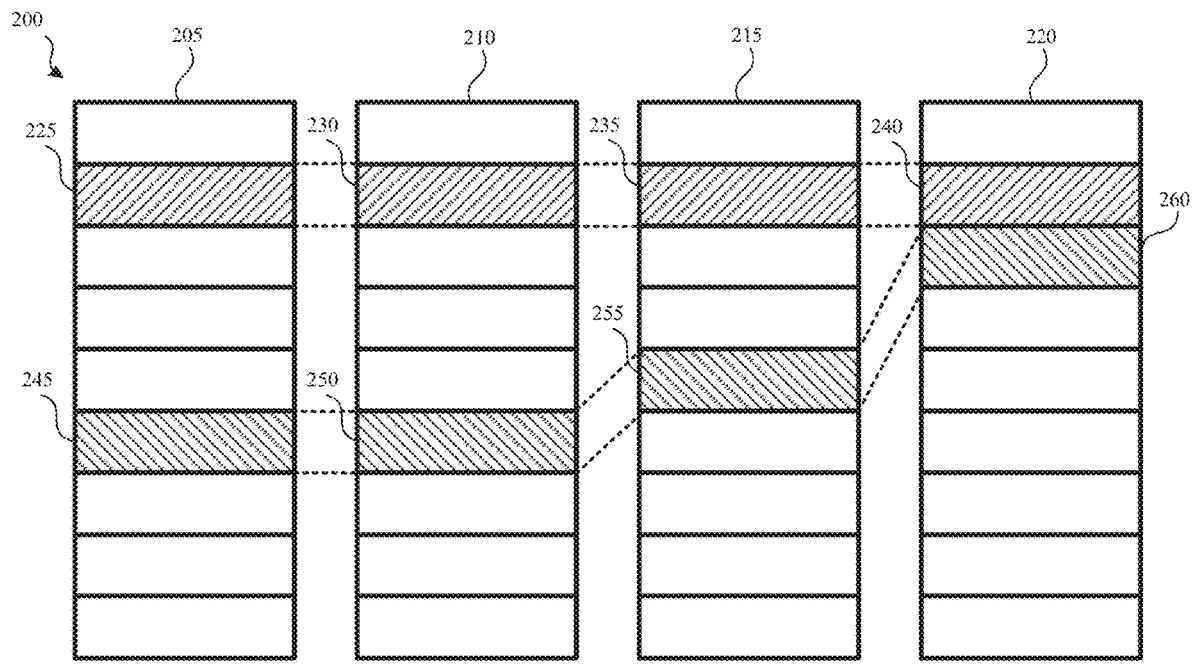
FIG. 2A illustrates how various blocks of a memory die may be organized into metablocks according to an example.

FIG. 2A illustrates organization of physical memory of a memory device 200. The memory device 200 may be similar to the memory device 155 shown and described with respect to FIG. 1.

In an example, the memory device 200 may be arranged in memory blocks with each memory block including a number of memory cells. A memory block of memory cells is the smallest unit that is physically erasable. For increased parallelism, each memory block may be operated or organized in larger blocks, called metablocks. For example, one memory block from a first plane of a memory die may be logically linked to another memory block from a second plane of the memory die to form a metablock.

In the example shown in FIG. 2A, the memory device 200 includes four planes or sub-arrays of memory blocks. For example, the memory device 200 includes a first plane 205, a second plane 210, a third plane 215, and a fourth plane 220. Each plane may be integrated on a single memory die. In another example, two planes (e.g., the first plane 205 and the second plane 210) may be provided on a first memory die while two planes (e.g., the third plane 215 and the fourth plane 220) may be provided on a second memory die. In yet another example, each plane may be provided on four separate memory dies. Although four planes are shown and described, the memory device 200 may have any number of planes and/or memory dies.

In an example, each plane is divided into memory blocks containing memory cells. In FIG. 2A the rectangles represent each memory block, such as memory block 225, memory block 230, memory block 235 and memory block 240. There may be dozens or hundreds of memory blocks in each plane of the memory device 200.

As indicated above, various memory blocks may be logically linked or grouped together (e.g., using a table in or otherwise accessible by the controller 150) to form a metablock. Each metablock may be written to, read from and/or erased as a single unit. For example, memory block 225, memory block 230, memory block 235 and memory block 240 may form a first metablock while memory block 245, memory block 250, memory block 255 and memory block 260 may form a second metablock. The memory blocks used to form a metablock need not be restricted to the same relative locations within their respective planes.

Figure 2B:
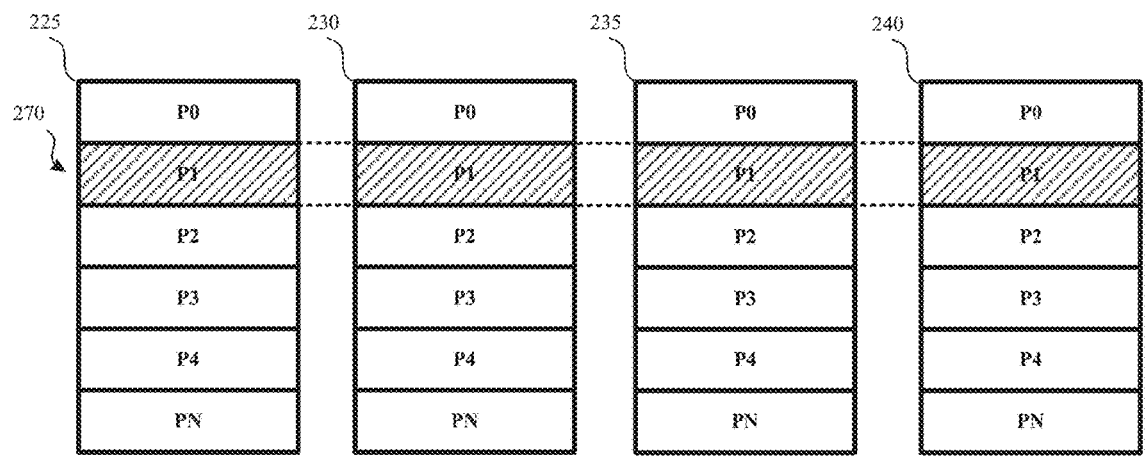
FIG. 2B illustrates how a memory block may include one or more pages according to an example.

FIG. 2B illustrates how a memory block may include one or more pages according to an example. In an example, each memory block may be divided, for operational purposes, into pages of memory cells. For example, memory cells of memory block 225, memory block 230, memory block 235 and memory block 240 are divided into N pages (shown as P0-PN). In an example, there may be 16, 32, or more pages of memory cells within each memory block.

In an example, a page is a unit of data programming within the memory block. Each page includes the minimum amount of data that can be programmed at one time. The minimum unit of data that can be read at one time may be less than a page.

Various pages of one or more memory blocks may be grouped to form a metapage 270. For example, the metapage 270 is formed by one physical page from memory block 225, memory block 230, memory block 235 and memory block 240. In the example, shown in FIG. 2B, the metapage 270 includes page P1 in each of the four memory blocks. However, the pages of the metapage 270 need not necessarily have the same relative position within each of the memory blocks. A metapage 270 may be the maximum unit of programming within a memory block.

A controller (e.g., controller 150 (FIG. 1)) may initiate one or more read operations, one or more write operations and/or one or more erase operations (collectively referred to as host operations) on the memory device 200. Each host operation may be performed on each plane of each memory die independently. For example, the timing of various host operations across the different planes and/or across different pages, memory cells and/or storage elements, do not necessarily need to align. Additionally, the host operations may be performed on the memory blocks and/or pages in any order. Accordingly, each host operation may be performed on each plane in parallel, synchronously, simultaneously, substantially simultaneously and/or asynchronously. Thus, the memory device 200 may support or otherwise enable Asynchronous Independent Plane Rear (AIPR), Asynchronous Independent Plane Program (AIPP) and/or Separate command Address Protocol (SCA).

The memory blocks disclosed in FIG. 2A-FIG. 2B are referred to herein as physical memory blocks because they relate to groups of physical memory cells. As used herein, a logical memory block is a virtual unit of address space defined to have the same size as a physical memory block. Each logical memory block includes a range of logical memory block addresses (LBAs) that are associated with data received from a host. The LBAs are then mapped to one or more physical memory blocks in the data storage device 110 where the data is physically stored.

Figure 3A:
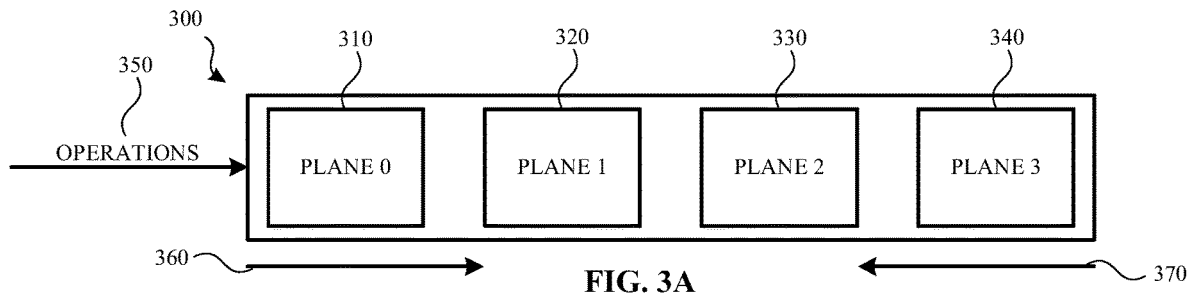
FIG. 3A illustrates an example storage architecture scheme for performing host operations on a memory device according to an example.

FIG. 3A illustrates an example storage architecture scheme for performing host operations on a memory device 300 according to an example. The memory device 300 may be similar to the memory device 155 shown and described with respect to FIG. 1 and/or the memory device 200 shown and described with respect to FIG. 2A-FIG. 2B.

In the example shown in FIG. 3A, the memory device 300 includes four planes, Plane 0 310, Plane 1 320, Plane 2 330 and Plane 3 340. Further each plane may have one or more memory blocks, or metablocks, with each having one or more pages or metapages. Although the examples herein are directed to a memory device 300 having four planes, the memory device 300 may be comprised of any number of planes. Additionally, the memory device 300 may be comprised four memory dies (e.g., Memory Die 0, Memory Die 1, Memory Die 2 and Memory Die 3), with each memory die may having one or more planes. Regardless of the structure of the memory device 300, the concepts discussed below may be equally applicable.

In an example, the memory device 300 receives operations 350. The operations 350 may be received from a host device (e.g., host device 105 (FIG. 1)), a controller (e.g., controller 150 (FIG. 1)) associated with the memory device 300, and/or be executed by the memory device 300 based on instructions from firmware (e.g., firmware 160 (FIG. 1)) associated with the memory device 300. The operations 350 may include read operations, write operations, or erase operations.

In an example, the operations 350 may be executed in sequence. For example, an operation may be performed on Plane 0 310, followed by Plane 1 320, Plane 2 330 and Plane 3 340. In another example, the operations 350 may be performed on the various planes randomly and/or non-sequentially. For example, firmware may track the operations 350 that are to be written on Plane 0 310, Plane 1 320, Plane 2 330 and Plane 3 340. However, the order of execution might be Plane 3 340, followed by Plane 0 310 and Plane 1 320 or the order of execution might be Plane 2, followed by Plane 3 340 and Plane 0 310. In an example, the order may be based on a host pattern, sequential patterns or random patterns.

In an example, the operations 350 performed on a subset of the planes are similar operations (e.g., read operations). In another example, the operations 350 may be non-similar operations (e.g., a combination of program and read operations or a combination of erase and read operations). However, as previously explained, each of the operations 350 may be executed on each plane of the memory device 300 independently.

In the examples shown and described with respect to FIG. 3B-FIG. 4D, some of the operations 350 are referred to as host operations while other operations (e.g., garbage collection operations) are referred to as non-similar operations. For example, the host operations are write operations that are performed on a page of a memory block or metablock associated with each plane. Additionally, each write operation is performed independently and in sequence across each plane. For example, the host operations will be performed from Plane 0 310 to Plane 3 340 (as indicated by arrow 360).

However, non-similar operations, such as a garbage collection operations, may also be performed in parallel with the host operations. In an example, the garbage collection operations may be performed on one or more planes (or memory dies) of the memory device 300 that are not currently participating in executing the host operations 350. Additionally, the non-similar operations are performed in a reverse order when compared with the host operations 350. For example, and as shown in FIG. 3A, the non-similar operations may be performed from Plane 3 340 to Plane 0 310 as shown by arrow 370.

Figure 3B:
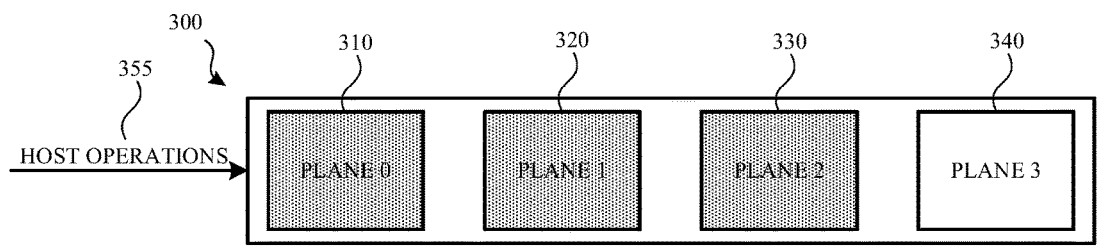
FIG. 3B illustrates a first set of host operations being performed on a subset of planes of the memory device according to an example.

FIG. 3B illustrates a first set of host operations 355 being performed on a subset of planes of the memory device 300 according to an example. The first set of host operations 355 may be a subset of the operations 350 shown and described with respect to FIG. 3A.

Additionally, in this example, the operations 350, and the various subset of host operations described below, are write operations. However, it is contemplated that the operations 350 may be any operation requested or provided by a host device. Further, in the examples shown and described with respect to FIG. 3B-FIG. 3E, planes that are performing host operations (e.g., host operations 355) are shown with shading, while planes that are performing non-similar operations (e.g., garbage collection operations) are shown without shading.

In response to receiving the first set of host operations 355 the controller and/or firmware associated with the memory device 300 will cause a first write operation to be performed on a first page of a memory block of Plane 0 310. For example, host data may be transferred or otherwise provided to the first page of the memory block of Plane 0 310. Once the host data has been transferred to, or is otherwise received by, Plane 0 310, a programming operation may commence in which the host data is written to the first page of a memory block.

When the programming operation on the first page of the memory block of Plane 0 310 has begun, host data may be provided to a first page of a memory block of Plane 1 320. When the host data has been transferred to, or is otherwise received by Plane 1 320, a programming operation may commence in which the host data is written to the first page of the memory block of Plane 1 320. This same process may repeat for Plane 2 330.

Figure 4A:
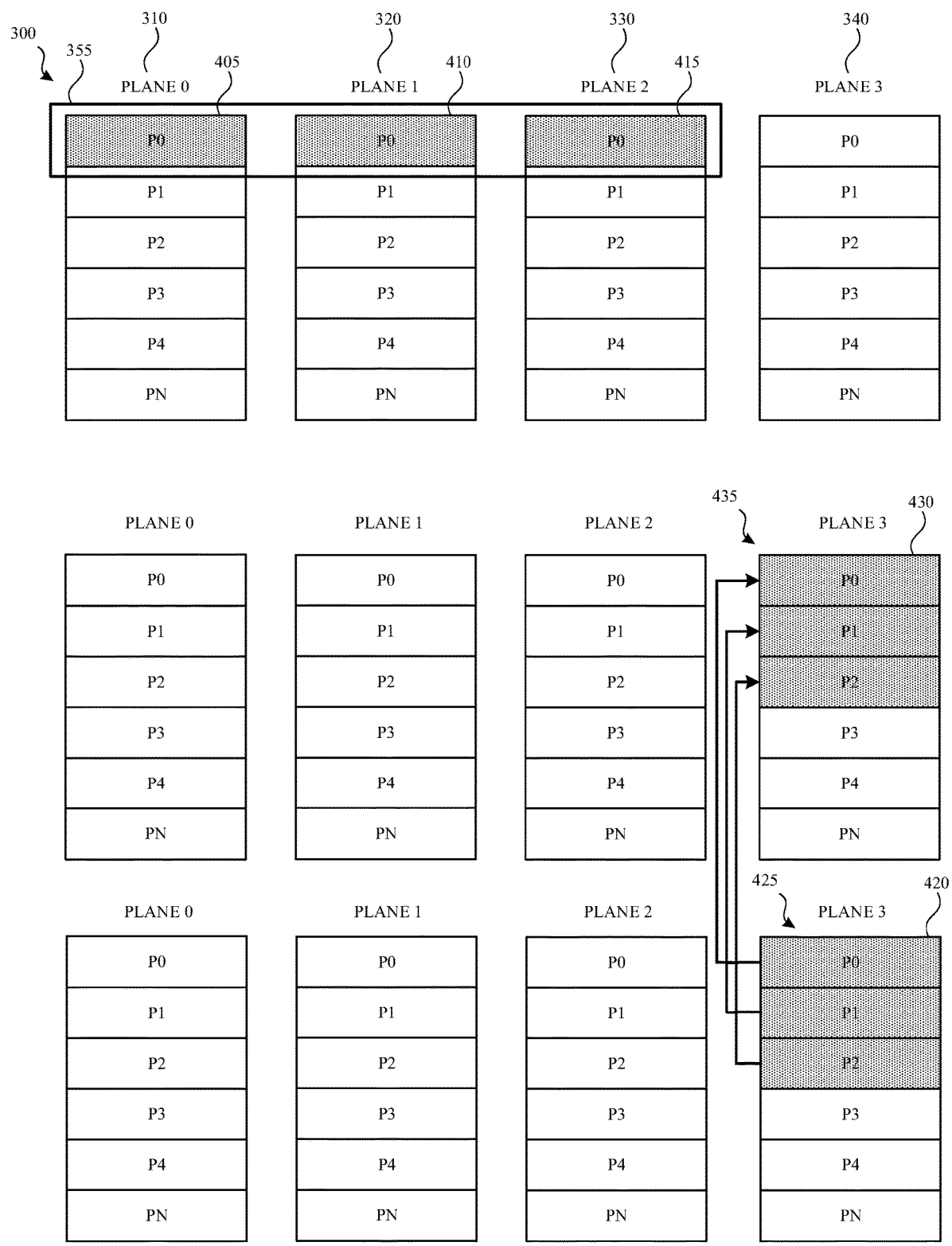
FIG. 4A illustrates a host operation being performed on a subset of planes of a memory device while a garbage collection process is being performed on another plane of the memory device according to an example.

For example, and referring to FIG. 4A, the first set of host operations 355 is performed on Plane 0 310, Plane 1 320, and Plane 2 330. In this example, the host data is written to page P0 405 on Plane 0 310, to page P0 410 of Plane 1 320 and to page P0 330 of Plane 2 330.

Referring back to FIG. 3B, while programming is occurring on Plane 0 310, Plane 1 320 and Plane 2 330, Plane 3 340 may be idle. As such, the controller and/or firmware associated with the memory device 300 may cause or otherwise instruct Plane 3 340 to perform one or more non-similar operations. As previously mentioned, the non-similar operations may be one or more garbage collection operations (although other operations are contemplated).

For example and referring back to FIG. 4A, while page P0 405 of Plane 0 310 is being programmed, the firmware and/or the controller may cause a first page (e.g., Page P0 420) from a source memory block 425 of Plane 3 340 to be read. Data that is read from the first page of the source memory block 425 of Plane 3 340 may be transferred and/or written to a page (e.g., page P0 430) on a destination memory block 430 of Plane 3 340.

Likewise, while the page P0 410 is being programmed on Plane 1 320, the firmware and/or the controller may read a second page (e.g., page P2) from the source memory block 425 of Plane 3 340 and transfer and/or write the second page to the destination memory block 435 of Plane 3 340. Additionally, while the page P0 415 is being programmed on Plane 2 330, the firmware and/or the controller may read a third page (e.g., page P2) from the source memory block 425 of Plane 3 340 and transfer and/or write the third page to the destination memory block 435 of Plane 3 340.

Figure 3C:
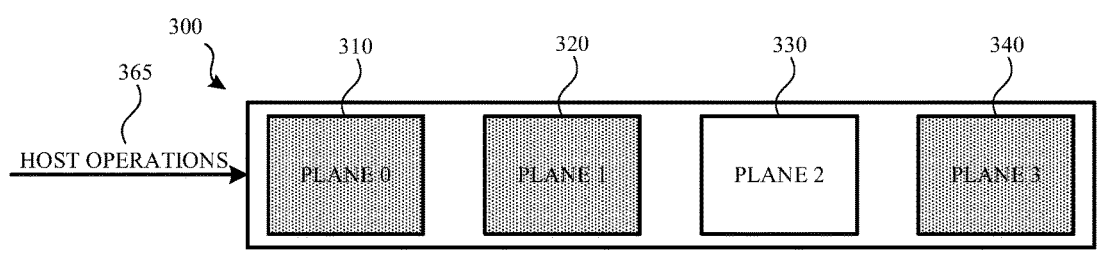
FIG. 3C illustrates a second set of host operations being performed on the subset of planes of the memory device according to an example.

FIG. 3C illustrates a second set of host operations 365 being performed on the subset of planes of the memory device 300 according to an example. In an example, the second set of host operations 365 may be separate from the first set of host operations 355. In another example, the second set of host operations 365 may be a continuation of the first set of host operations 355.

In this example, the first set of host operations 355 ended at Plane 2 330. As such, and due to the nature of sequential write operations, the second set of host operation 365 will begin executing on Plane 3 340. For example, in response to receiving the second set of host operations 365, the controller and/or firmware associated with the memory device 300 will cause a first write operation to be performed on a first page of a memory block of Plane 3 340.

For example, host data may be transferred or otherwise provided to the first page of the memory block of Plane 3 340. Once the host data has been transferred to, or is otherwise received by, Plane 3 340, a programming operation may commence in which the host data is written to the first page of the memory block of Plane 3 340.

When the programming operation on the first page of the memory block of Plane 3 340 has begun, host data may be provided to a second page of the memory block of Plane 0 310. When the host data has been transferred to, or is otherwise received by, Plane 0 310, a programming operation may commence in which the host data is written to the second page of the memory block of Plane 0 310. This same process may repeat for Plane 1 320.

Figure 4B:
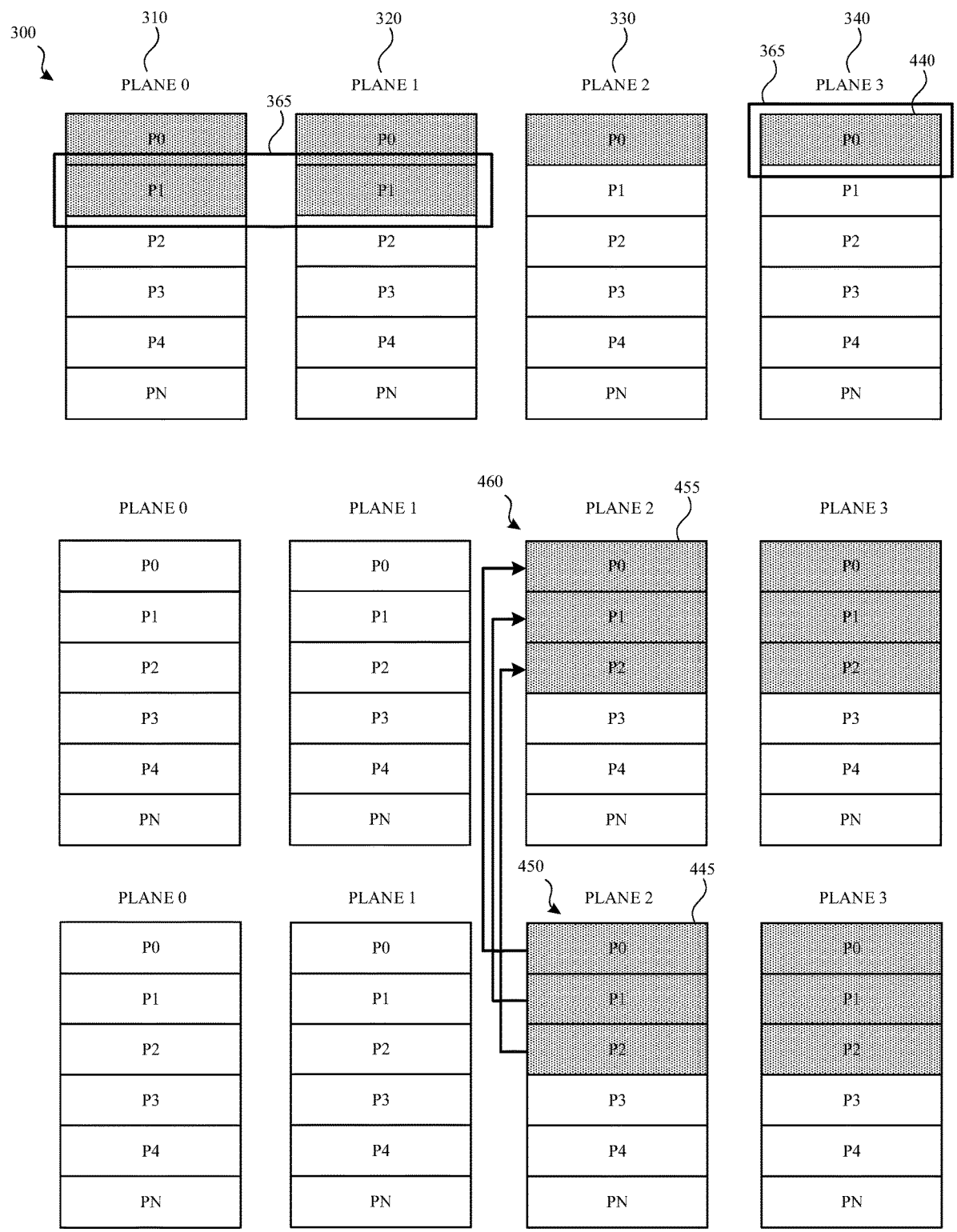
FIG. 4B illustrates a second host operation being performed on a subset of planes of a memory device while a garbage collection process is being performed on another plane of the memory device according to an example.
Figure 4C:
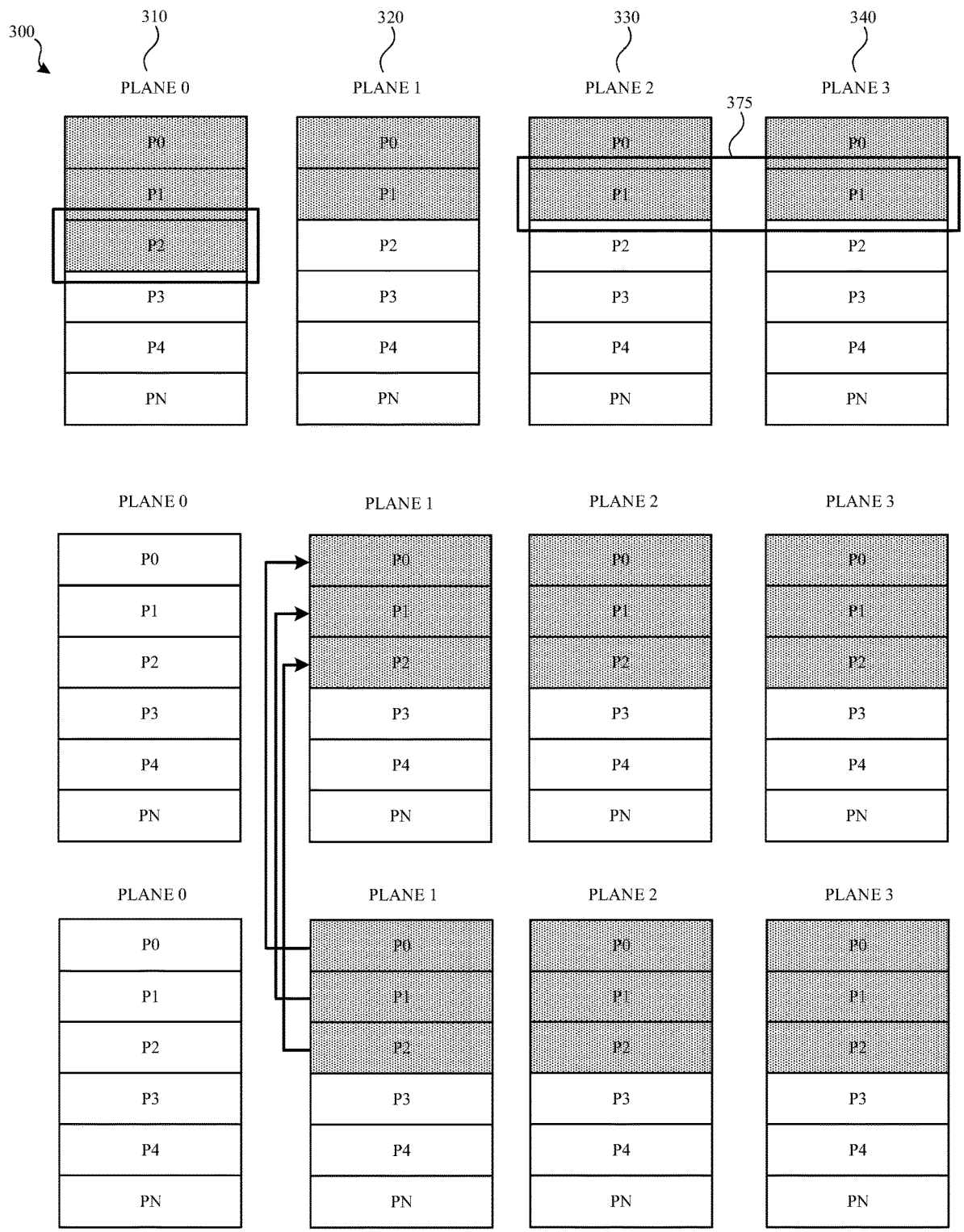
FIG. 4C illustrates a third host operation being performed on a subset of planes of a memory device while a garbage collection process is being performed on another plane of the memory device according to an example.

For example, and referring to FIG. 4B, the second set of host operations 365 is performed on Plane 3 340, Plane 0 310, and Plane 1 320. In this example, the host data is written to page P0 440 on Plane 3 340, to page P1 of Plane 0 310 and to page P1 of Plane 2 320.

Referring back to FIG. 3C, while the write operations are occurring on Plane 3 340, Plane 0 310 and Plane 1 320, Plane 2 330 may be idle. As such, the controller and/or firmware associated with the memory device 300 may cause or otherwise instruct Plane 2 330 to perform one or more non-similar operations such as previously described. The firmware and/or the controller may cause one or more pages from a source memory block on Plane 2 330 to be read and subsequently transferred and/or written to a destination memory block on Plane 2 330 while programming is occurring on Plane 3 340, Plane 0 310 and Plane 1 320.

For example and referring back to FIG. 4B, while page P0 440 of Plane 3 340 is being programmed, the firmware and/or the controller may cause a first page (e.g., Page P0 445) from a source memory block 450 of Plane 2 330 to be read. Data that is read from the first page of the source memory block 450 of Plane 2 330 may be transferred and/or written to a page (e.g., page P0 455) on a destination memory block 460 of Plane 2 330.

Likewise, while the page P1 is being programmed on Plane 0 310, the firmware and/or the controller may read a second page (e.g., page P2) from the source memory block 450 of Plane 2 330 and transfer and/or write the second page to the destination memory block 460 of Plane 2 330. Additionally, while the page P2 is being programmed on Plane 1 320, the firmware and/or the controller may read a third page (e.g., page P2) from the source memory block 450 of Plane 2 330 and transfer and/or write the third page to the destination memory block 460 of Plane 2 330.

Figure 3D:
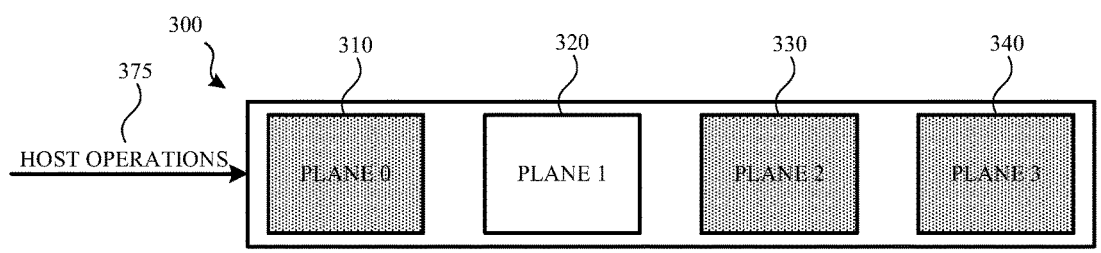
FIG. 3D illustrates a third set of host operations being performed on the subset of planes of the memory device according to an example.
Figure 3E:
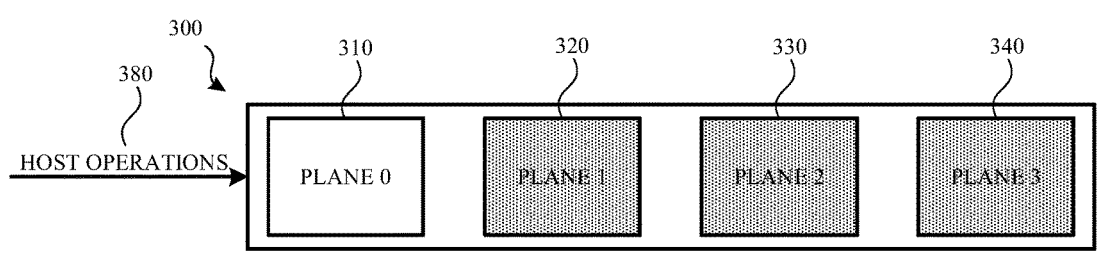
FIG. 3E illustrates a fourth set of host operations being performed on the subset of planes of the memory device according to an example.

FIG. 3D illustrates a third set of host operations 375 being performed on the subset of planes of the memory device 300 according to an example and FIG. 3E illustrates a fourth set of host operations 380 being performed on the subset of planes of the memory device 300 according to an example. In an example, the third set of host operations 375 and/or the fourth set of operations 380 may be separate from the first set of host operations 355 and/or the second set of operations 355. In another example, the third set of host operations 375 and/or the fourth set of operations 380 may be a continuation of the first set of host operations 355 and/or the second set of host operations 365.

In the example shown in FIG. 3D, the second set of host operations 365 ended at Plane 1 320. As such, and due to the nature of sequential write operations, the third set of host operation 375 will begin executing on Plane 2 330. As such and in response to receiving the third set of host operations 375, the controller and/or firmware associated with the memory device 300 will cause a write operation to be performed on a second page of the memory block of Plane 2 330, to a second page of the memory block of Plane 3 340 and to a third page of the memory block of Plane 0 310. This is shown in greater detail in FIG. 4C.

While the write operations are occurring on Plane 2 330, Plane 3 340 and Plane 0 310, Plane 1 320 may be idle. As such, the controller and/or firmware associated with the memory device 300 may cause or otherwise instruct Plane 1 320 to perform one or more non-similar operations such as previously described. The non-similar operations are also shown in greater detail with respect to FIG. 4C.

Likewise, in the example shown in FIG. 3E, the third set of host operations 375 ended at Plane 0 310. As such, the fourth set of host operations 380 may begin executing on Plane 1 320. In response to receiving the fourth set of host operations 380, the controller and/or firmware associated with the memory device 300 will cause a write operation to be performed on a third page of the memory block of Plane 1 320, to a third page of the memory block of Plane 2 330 and to a third page of the memory block of Plane 3 340. This is shown in greater detail with respect to FIG. 4D.

While the write operations are occurring on Plane 1 320, Plane 2 330 and Plane 3 340, Plane 0 310 may be idle. As such, the controller and/or firmware associated with the memory device 300 may cause or otherwise instruct Plane 0 310 to perform one or more non-similar operations such as previously described. The non-similar operations are also shown in greater detail with respect to FIG. 4D.

Figure 4D:
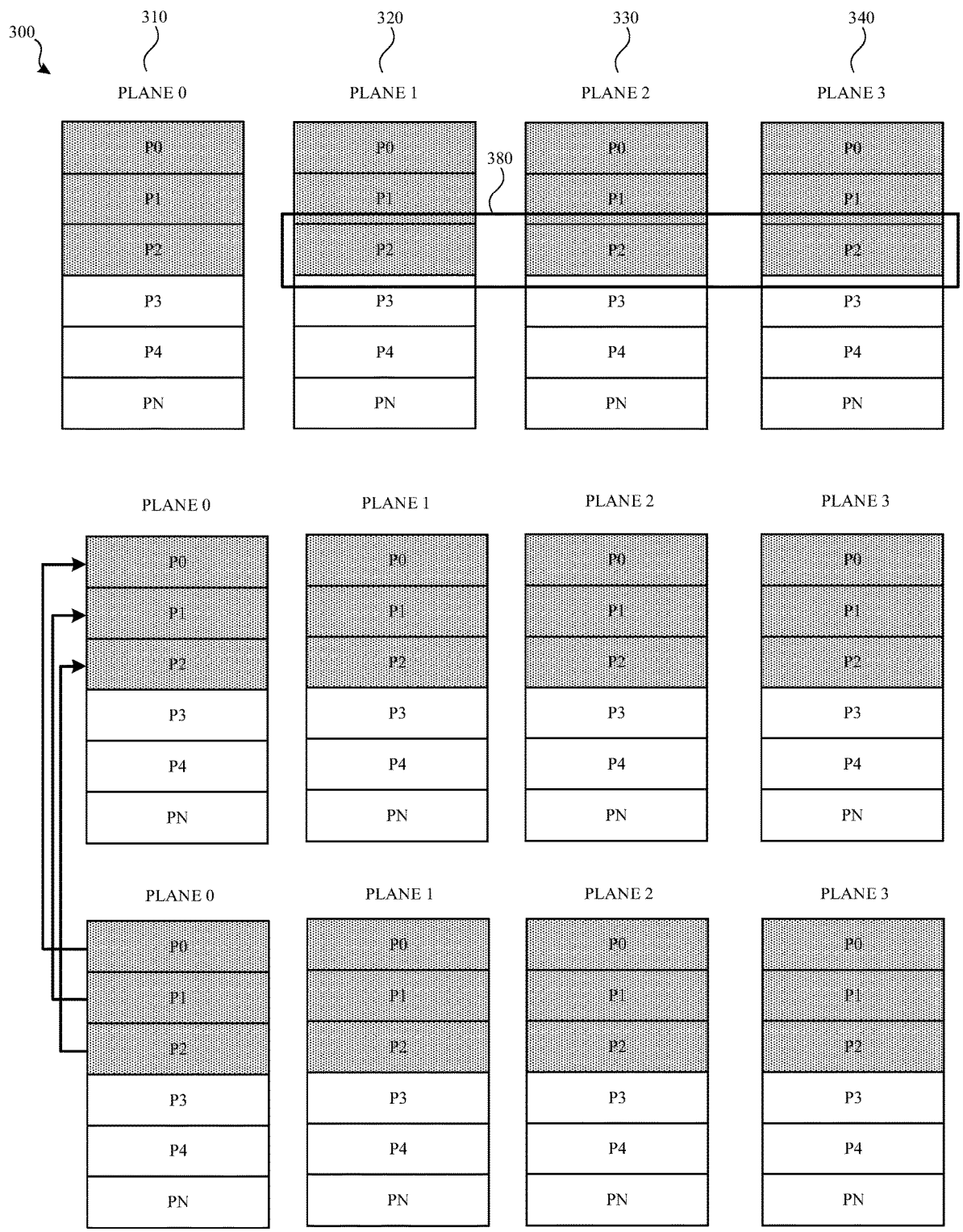
FIG. 4D illustrates a fourth host operation being performed on a subset of planes of a memory device while a garbage collection process is being performed on another plane of the memory device according to an example.

In this example and as shown in FIG. 4D, programming operations have been performed on three different pages of each plane. Likewise all of the planes have recovered three pages. This process may repeat any number of times. However, as indicated above, different combinations of host operations and/or non-similar operations may be performed in parallel.

Additionally, while the examples shown and described with respect to FIG. 3A-FIG. 4D are given with respect to sequential operations, the same or similar concepts may be equally applied to non-sequential operations. In this example, a controller or firmware may track planes, blocks and/or pages that are actively being programmed and also track planes, blocks and/or pages that are idle. Based on this information, the firmware and/or controller may provide programming operations and non-similar operations in a similar manner as previously described.

Figure 5:
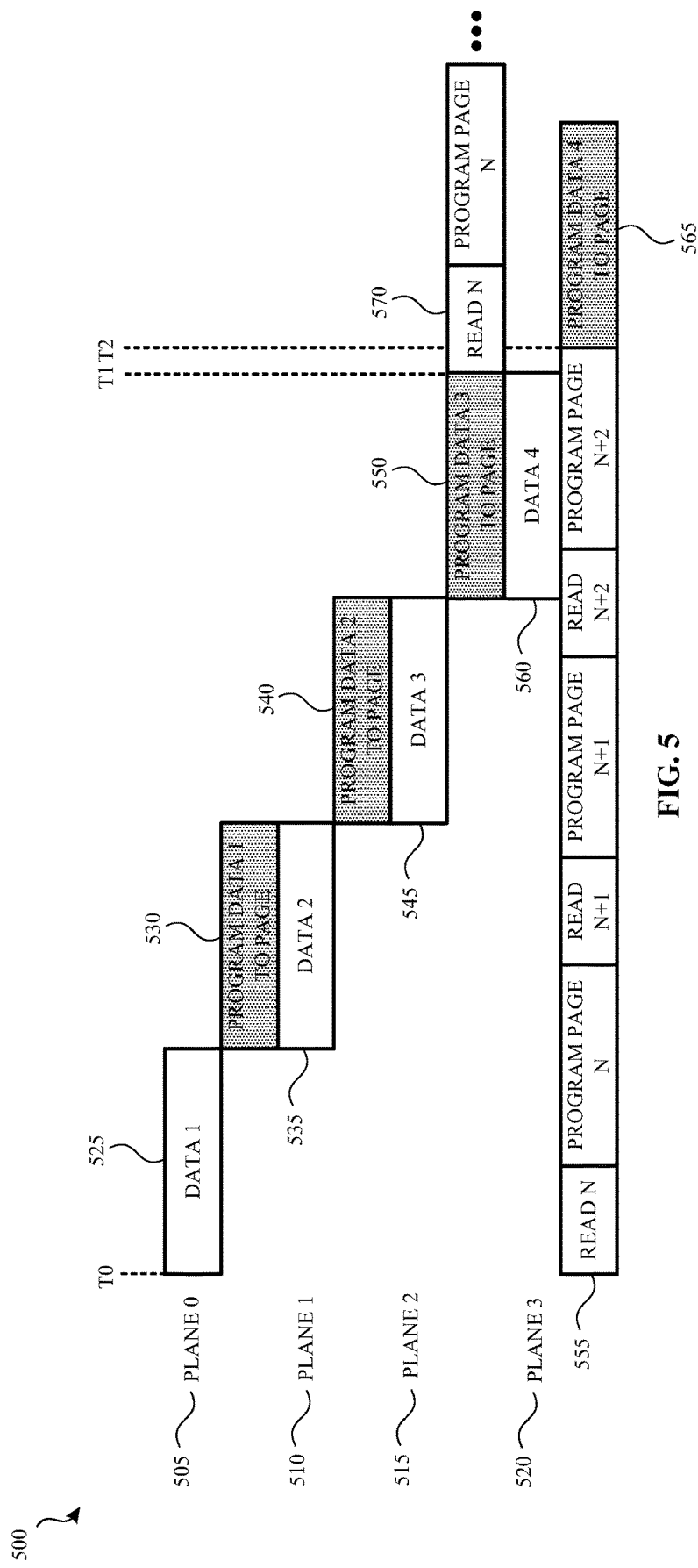
FIG. 5 is a timing diagram that illustrates how one or more host operations may be executed on one or more planes of a memory device while one or more non-similar operations may be executed in parallel on another plane of the memory device according to an example.

FIG. 5 is a timing diagram 500 that illustrates how one or more host operations may be executed on one or more planes of a memory device while one or more non-similar operations (e.g., garbage collection operations) may be executed in parallel on another plane of the memory device. In an example, the planes, the host operations and the non-similar operations shown and described with respect to FIG. 5 may be similar to the planes, host operations and non-similar operations shown and described with respect to FIG. 3A-FIG. 4D.

In the example shown in FIG. 5, a memory device may include four planes, Plane 0 505, Plane 1 510, Plane 2 515 and Plane 3 520. At time T0, Plane 0 505 may receive host data (e.g., Data 1 525). Once the Data 1 525 has been received, a programming operation 530 programs the data to a page (e.g., of a memory block associated with Plane 0 505).

When the programming operation 530 commences, additional host data (e.g., Data 2 535), may be transferred to Plane 1 510. Once the programming operation 530 is complete and Data 2 535 has been received, a programming operation 540 may cause Data 2 535 to be written to a page of a memory block associated with Plane 1 510. Likewise, when the programming operation 540 commences, Data 3 545 may be transferred to Plane 2 515. When the programming operation 540 is complete and Data 3 545 has been received, a programming operation 550 may cause Data 3 545 to be written to a page of a memory block associated with Plane 2 545. In this example, programming the data to Plane 0 505, Plane 1 510 and Plane 2 515, may occur between time T0 and time T1.

In this example and as discussed above with respect to FIG. 3A-FIG. 4D, Plane 3 520 may be idle. Firmware associated with the memory device on which the planes are located may determine that one or more non-similar operations 555 (e.g., garbage collection operations) may be performed on Plane 3 520 while the above-mentioned operations are being executed.

As such, at time T0, the firmware and/or the controller of the memory device may cause a read operation to be performed on a first page of a source memory block of Plane 3 520. Once the first page of the source memory block is read, it may be written (represented by "Program Page N") to a page of a destination block associated with Plane 3 520. This same process may occur for pages N+1 and N+2.

In the example shown, the non-similar operations may be completed between time T0 and time T2. While the time between T0 and T1 may be slightly shorter than the time between T0 and T2, the overall performance benefit of performing non-similar operations such as described herein may outweigh the delay, especially when compared with performance parameters of garbage collection operations being intermixed with host operations. Accordingly, an amount of time between T0 and T1 may be substantially equivalent to an amount of time between T0 and T2.

In an example, during the programming operation, host data (e.g., Data 4 560) may be provided to Plane 3 520. It should be appreciated that the host data (Data 4 560) is being received in parallel with non-similar operations 555 being performed. However, even though Data 4 560 may be received, a programming operation 565 that programs the data to a page of a memory block associated with Plane 3 520 may not commence until time T2 (e.g., a time at which the non-similar operations 555 have been completed on Plane 3 520.)

As also shown in FIG. 5, at time T1, a second set of non-similar operations 570 may be performed on Plane 2 515 (which is now idle). The processes described above may be repeated.

Figure 6:
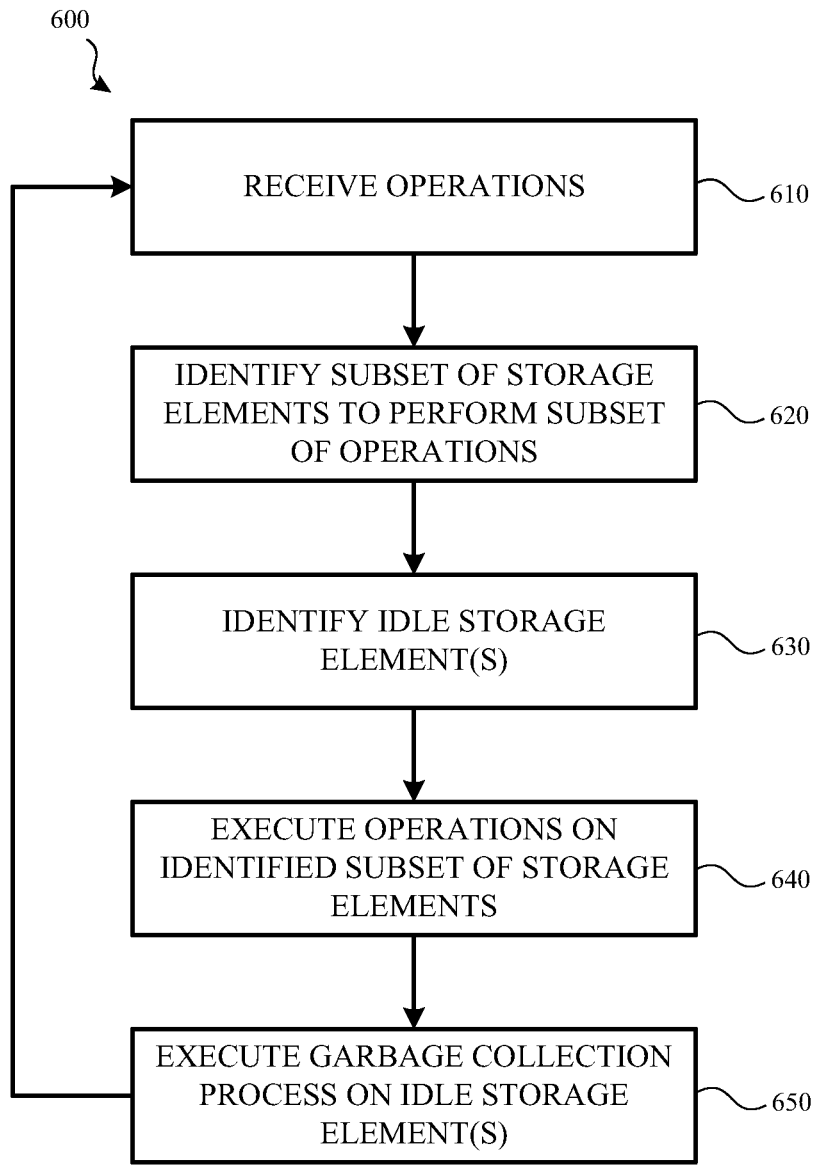
FIG. 6 illustrates a method for performing host operations in parallel with garbage collection operations according to an example.

FIG. 6 illustrates a method 600 for performing host operations in parallel with garbage collection operations according to an example. The method 600 may be performed by a controller (e.g., controller 150 (FIG. 1)) and/or firmware (e.g., firmware 160 (FIG. 1)) associated with a data storage device (e.g., data storage device 110 (FIG. 1)) and/or a memory device (e.g., memory device 155 (FIG. 1)).

Method 600 begins when operations are received (610) by the data storage device. In an example, the operations are host operations that are received from a host device. Additionally, the data storage device may include a number of storage elements. In an example, the storage elements are memory dies with each of the memory dies having one or more planes. In another example, the storage elements are planes of at least one memory die.

Upon receipt of the operations, the controller and/or the firmware of the data storage device may determine how the operations are to be executed. For example, the controller and/or the firmware may identify (620) a subset storage elements on which the operations will be performed. In an example, the operations are performed in sequence (e.g., from a first storage element to a n storage element). As such, the controller and/or firmware may determine to start execution or performance of the operations on the first storage element, then on a second storage element until a n−1 storage element.

The controller and/or firmware may also identify (630) one or more idle storage elements. In an example, an idle storage element may be a storage element that the firmware and/or the controller has identified as being able to perform one or more garbage collection operations while the other storage elements are performing the operations received from the host device. In an example, the one or more idle storage elements may be identified based, at least in part, on a number of factors, including, but not limited to, an amount of time required to complete a determined amount of garbage collection operations compared with a determined amount of time to complete one or more host operations.

The operations from the host device may then be executed (640) on the identified subset of storage elements (e.g., from the first storage element to the n−1 storage element). At the same time, or substantially the same time, the firmware and/or the controller will cause garbage collection operations to be executed (650) on the identified idle storage element (e.g., the n storage element).

The method 600 may be repeated upon completion of the operations being executed on the first storage element to the n−1 storage element and upon completion of the first garbage collection operation on the n storage element. However, in a second iteration of the method 600, the operations are executed on the n storage element to a n−2 storage element. Likewise, while the operations are being executed on the n storage element to the n−2 storage element, a second garbage collection operation is being executed on the n−1 storage element. Thus, host operations may be performed in sequence from a first storage element to a n storage element while garbage collection operations may be performed, in parallel, from the n storage element to the first storage element.

Figure 7:
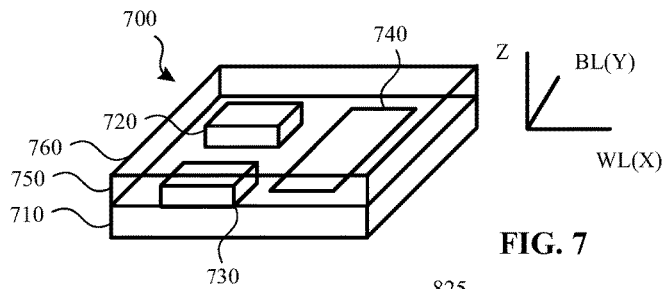
FIG. 7 is a perspective view of a storage device that includes three-dimensional (3D) stacked non-volatile memory according to an example.

FIG. 7 is a perspective view of a storage device 700 that includes three-dimensional (3D) stacked non-volatile memory according to an example. In this example, the storage device 700 includes a substrate 710. Blocks of memory cells are included on or above the substrate 710. The blocks may include a first block (BLK0 720) and a second block (BLK1 730). Each block may be formed of memory cells (e.g., non-volatile memory elements). The substrate 710 may also include a peripheral area 740 having support circuits that are used by the first block and the second block.

The substrate 710 may also carry circuits under the blocks, along with one or more lower metal layers which are patterned in conductive paths to carry signals from the circuits. The blocks may be formed in an intermediate region 750 of the storage device 700. The storage device may also include an upper region 760. The upper region 760 may include one or more upper metal layers that are patterned in conductive paths to carry signals from the circuits. Each block of memory cells may include a stacked area of memory cells. In an example, alternating levels of the stack represent word lines. While two blocks are depicted, additional blocks may be used and extend in the x-direction and/or the y-direction.

In an example, a length of a plane of the substrate 710 in the x-direction represents a direction in which signal paths for word lines or control gate lines extend (e.g., a word line or drain-end select gate (SGD) line direction) and the width of the plane of the substrate 710 in the y-direction represents a direction in which signal paths for bit lines extend (e.g., a bit line direction). The z-direction represents a height of the storage device 700.

Figure 8:
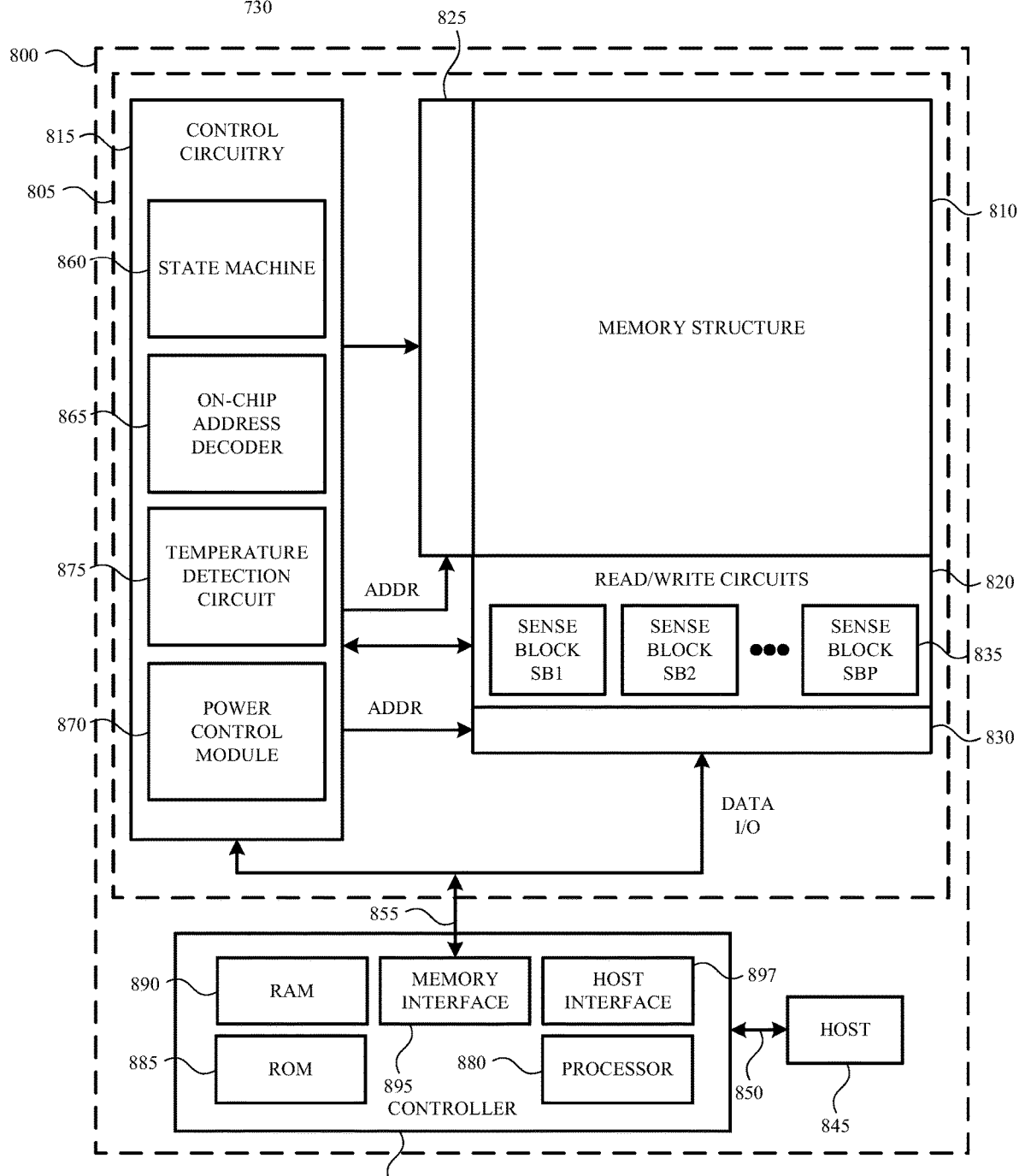
FIG. 8 is a block diagram of a storage device according to an example.

FIG. 8 is a functional block diagram of a storage device 800 according to an example. In an example, the storage device 800 may be the 3D stacked non-volatile storage device 700 shown and described with respect to FIG. 7. The components depicted in FIG. 8 may be electrical circuits. In an example, the storage device 800 includes one or more memory dies 805. Each memory die 805 includes a three-dimensional memory structure 810 of memory cells (e.g., a 3D array of memory cells), control circuitry 815, and read/write circuits 820. In another example, a two-dimensional array of memory cells may be used. The memory structure 810 is addressable by word lines using a first decoder 825 (e.g., a row decoder) and by bit lines using a second decoder 830 (e.g., a column decoder). The read/write circuits 820 may also include multiple sense blocks 835 including SB1, SB2, . . . , SBp (e.g., sensing circuitry) which allow pages of the memory cells to be read or programmed in parallel. The sense blocks 835 may include bit line drivers.

In an example, a controller 840 is included in the same storage device 800 as the one or more memory dies 805. In another example, the controller 840 is formed on a die that is bonded to a memory die 805, in which case each memory die 805 may have its own controller 840. In yet another example, a controller die controls all of the memory dies 805.

Commands and data may be transferred between a host 845 and the controller 840 using a data bus 850. Commands and data may also be transferred between the controller 840 and one or more of the memory dies 805 by way of lines 855. In one example, the memory die 805 includes a set of input and/or output (I/O) pins that connect to lines 855.

The memory structure 810 may also include one or more arrays of memory cells. The memory cells may be arranged in a three-dimensional array or a two-dimensional array. The memory structure 810 may include any type of non-volatile memory that is formed on one or more physical levels of arrays of memory cells having an active area disposed above a silicon substrate. The memory structure 810 may be in a non-volatile memory device having circuitry associated with the operation of the memory cells, whether the associated circuitry is above or within the substrate.

The control circuitry 815 works in conjunction with the read/write circuits 820 to perform memory operations (e.g., erase, program, read, and others) on the memory structure 810. The control circuitry 815 may include registers, ROM fuses, and other devices for storing default values such as base voltages and other parameters.

The control circuitry 815 may also include a state machine 860, an on-chip address decoder 865, a power control module 870 and a temperature detection circuit 875. The state machine 860 may provide chip-level control of various memory operations. The state machine 860 may be programmable by software. In another example, the state machine 860 does not use software and is completely implemented in hardware (e.g., electrical circuits).

The on-chip address decoder 865 may provide an address interface between addresses used by host 845 and/or the controller 840 to a hardware address used by the first decoder 825 and the second decoder 830.

The power control module 870 may control power and voltages that are supplied to the word lines and bit lines during memory operations. The power control module 870 may include drivers for word line layers in a 3D configuration, select transistors (e.g., SGS and SGD transistors) and source lines. The power control module 870 may include one or more charge pumps for creating voltages.

The control circuitry 815 may also include a temperature detection circuit 875. The temperature detection circuit may be configured to detect a temperature of one or more components of the memory device 800.

The control circuitry 815, the state machine 860, the on-chip address decoder 865, the first decoder 825, the second decoder 830, the temperature detection circuit 875, the power control module 870, the sense blocks 835, the read/write circuits 820, and/or the controller 840 may be considered one or more control circuits and/or a managing circuit that perform some or all of the operations described herein.

In an example, the controller 840, is an electrical circuit that may be on-chip or off-chip. Additionally, the controller 840 may include one or more processors 880, ROM 885, RAM 890, memory interface 895, and host interface 897, all of which may be interconnected. In an example, the one or more processors 880 is one example of a control circuit. Other examples can use state machines or other custom circuits designed to perform one or more functions. Devices such as ROM 885 and RAM 890 may include code such as a set of instructions. One or more of the processors 880 may be operable to execute the set of instructions to provide some or all of the functionality described herein.

Alternatively or additionally, one or more of the processors 880 may access code from a memory device in the memory structure 810, such as a reserved area of memory cells connected to one or more word lines. The memory interface 895, in communication with ROM 885, RAM 890, and one or more of the processors 880, may be an electrical circuit that provides an electrical interface between the controller 840 and the memory die 805. For example, the memory interface 895 may change the format or timing of signals, provide a buffer, isolate from surges, latch I/O, and so forth.

The one or more processors 880 may issue commands to control circuitry 815, or any other component of memory die 805, using the memory interface 895. The host interface 897, in communication with the ROM 885, the RAM 895, and the one or more processors 880, may be an electrical circuit that provides an electrical interface between the controller 840 and the host 845. For example, the host interface 897 may change the format or timing of signals, provide a buffer, isolate from surges, latch I/O, and so on. Commands and data from the host 845 are received by the controller 840 by way of the host interface 897. Data sent to the host 845 may be transmitted using the data bus 850.

Multiple memory elements in the memory structure 810 may be configured so that they are connected in series or so that each element is individually accessible. By way of a non-limiting example, flash memory devices in a NAND configuration (e.g., NAND flash memory) typically contain memory elements connected in series. A NAND string is an example of a set of series-connected memory cells and select gate transistors.

The term computer-readable media as used herein may include computer storage media. Computer storage media may include volatile and nonvolatile, removable and non-removable media implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by a computing device (e.g., host device 105 (FIG. 1)). Any such computer storage media may be part of the computing device. Computer storage media does not include a carrier wave or other propagated or modulated data signal.

Additionally, examples described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various examples.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

In an example, the present disclosure describes a method, comprising: receiving, from a host device, a set of operations for a non-volatile storage device, the non-volatile storage device comprising a plurality of storage elements having a specified order for performing the set of operations; causing the set of operations to be performed on a first subset of the plurality of storage elements in the specified order; and while the set of operations are being performed on the first subset of the plurality of storage elements in the specified order, causing a plurality of non-similar operations to be performed on a second subset of the plurality of storage elements, wherein the plurality of non-similar operations are performed on the second subset of the plurality of storage elements in an order that is reversed from the specified order. In an example, the set of operations is a first set of operations and the plurality of non-similar operations is a first plurality of non-similar operations, and wherein the method further comprises: receiving, from the host device, a second set of operations for the non-volatile storage device; causing the second set of operations to be performed on a third subset of the plurality of storage elements in the specified order, the third subset of the plurality of storage elements being different than the first subset of the plurality of storage elements; and while the second set of operations are being performed on the third subset of the plurality of storage elements in the specified order, causing a second plurality of non-similar operations to be performed on a fourth subset of the plurality of storage elements, the fourth subset of the plurality of storage elements being different than the second subset of the plurality of storage elements and wherein the second plurality of non-similar operations are performed on the fourth subset of the plurality of storage elements in the order that is reversed from the specified order. In an example, the plurality of storage elements are memory dies. In an example, the plurality of storage elements are planes of at least one memory die. In an example, the plurality of non-similar operations comprise at least one of a read operation, a program operation and an erase operation. In an example, an amount of time required to complete the set of operations on the first subset of the plurality of storage elements in the specified order is substantially equivalent to an amount of time required to complete the plurality of non-similar operations to be performed on a second subset of the plurality of storage elements. In an example, the non-volatile storage device is a removable non-volatile storage device. In an example, each storage element in the second subset of the plurality of storage elements is identified as an idle storage elements prior to the plurality of non-similar operations being performed on the second subset of the plurality of storage elements. In an example, the specified order for executing the set of operations and the order that is reversed from the specified order is maintained by firmware.

In another example, the present disclosure describes a data storage device, comprising: a controller; n number of storage elements having a specified programming order from a first storage element to a n storage element; and a memory communicatively coupled to the controller and storing instructions that, when executed by the controller, perform operations, comprising: providing operations to the first storage element to a n−1 storage element; causing the operations to be executed on the first storage element to the n−1 storage element; while the operations are executed on the first storage element to the n−1 storage element, initiating a first garbage collection operation on the n storage element; and upon completion of the operations being executed on the first storage element to the n−1 storage element and upon completion of the first garbage collection operation on the n storage element: causing the operations to be executed on the n storage element to a n−2 storage element; and while the operations are executed on the n storage element to the n−2 storage element, initiating a second garbage collection operation on the n−1 storage element. In an example, the plurality of storage elements are memory dies. In an example, the plurality of storage elements are planes of at least one memory die. In an example, an amount of time required to complete the operations on the first storage element to the n−1 storage element is substantially equivalent to an amount of time required to complete the first garbage collection operation on the n storage element. In an example, the data storage device is a removable storage device. In an example, the n storage element is identified as an idle storage element prior to the operations being executed on the first storage element to the n−1 storage element.

In yet another example, the present disclosure describes a non-volatile storage device, comprising: a controller means; n number of storage means, wherein n is greater than two; means for providing a first set of operations to a first storage means of the n number of storage means to a n−1 storage means of the n number of storage means; means for causing the first set of operations to be executed on the first storage means to the n−1 storage means; means for causing a second set of operations to be executed on a n storage means of the n number of storage means while the first set of operations are being executed on the first storage means to the n−1 storage means, the second set of operations being different from the first set of operations; means for causing the first set of operations to be executed on the n storage means to a n−2 storage means of the n number of storage means upon completion of the second set of operations being executed on the n storage means; and means for causing a third set of operations to be executed on the n−1 storage means while the first set of operations are being executed on the n storage means to the n−2 storage means. In an example, the n number of storage means has a specified programming order from the first storage means to the n storage means. In an example, the second set of operations and the third set of operations are associated with garbage collection operations. In an example, the n storage means are memory dies. In an example, the n storage means are planes of at least one memory die.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks. Additionally, it is contemplated that the flowcharts and/or aspects of the flowcharts may be combined and/or performed in any order.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A method, comprising:
    receiving, from a host device, a set of operations for a non-volatile storage device, the non-volatile storage device comprising a plurality of storage elements having a specified order for performing the set of operations;
    determining a first subset of the plurality of storage elements on which the set of operations is to be performed;
    determining a second subset of the plurality of storage elements that will be idle during performance of the set of operations on the first subset of the plurality of storage elements;
    causing the set of operations to be performed on the first subset of the plurality of storage elements in the specified order; and
    while the set of operations are being performed on the first subset of the plurality of storage elements in the specified order, causing a plurality of non-similar operations to be concurrently performed on the second subset of the plurality of storage elements, wherein the plurality of non-similar operations are performed on the second subset of the plurality of storage elements in an order that is reversed from the specified order.

2. The method of claim 1, wherein the set of operations is a first set of operations and the plurality of non-similar operations is a first plurality of non-similar operations, and wherein the method further comprises:
    receiving, from the host device, a second set of operations for the non-volatile storage device;
    causing the second set of operations to be performed on a third subset of the plurality of storage elements in the specified order, the third subset of the plurality of storage elements being different than the first subset of the plurality of storage elements; and
    while the second set of operations are being performed on the third subset of the plurality of storage elements in the specified order, causing a second plurality of non-similar operations to be concurrently performed on a fourth subset of the plurality of storage elements, the fourth subset of the plurality of storage elements being different than the second subset of the plurality of storage elements and wherein the second plurality of non-similar operations are performed on the fourth subset of the plurality of storage elements in the order that is reversed from the specified order.

3. The method of claim 1, wherein the plurality of storage elements are memory dies.

4. The method of claim 1, wherein the plurality of storage elements are planes of at least one memory die.

5. The method of claim 1, wherein the plurality of non-similar operations comprise at least one of a read operation, a program operation and an erase operation.

6. The method of claim 1, wherein an amount of time required to complete the set of operations on the first subset of the plurality of storage elements in the specified order is substantially equivalent to an amount of time required to complete the plurality of non-similar operations to be performed on a second subset of the plurality of storage elements.

7. The method of claim 1, wherein each storage element in the second subset of the plurality of storage elements that is identified as being idle during the performance of the set of operations on the first subset of the plurality of storage elements is identified prior to the plurality of non-similar operations being performed on the second subset of the plurality of storage elements.

8. The method of claim 1, wherein the specified order for executing the set of operations and the order that is reversed from the specified order is maintained by firmware.

9. The method of claim 1, wherein the set operations are non-sequential operations.

10. A data storage device, comprising:
a controller;
n number of storage elements having a specified programming order from a first storage element to a nth storage element; and
a memory communicatively coupled to the controller and storing instructions that, when executed by the controller, perform operations, comprising:
providing operations to the first storage element to a n−1 storage element;
causing the operations to be executed on the first storage element to the n−1 storage element;
while the operations are executed on the first storage element to the n−1 storage element, initiating a first garbage collection operation on the nth storage element; and
upon completion of the operations being executed on the first storage element to the n−1 storage element and upon completion of the first garbage collection operation on the nth storage element:
causing the operations to be executed on the nth storage element to a n−2 storage element; and
while the operations are executed on the nth storage element to the n−2 storage element, initiating a second garbage collection operation on the n−1 storage element.

11. The data storage device of claim 10, wherein the plurality of storage elements are memory dies.

12. The data storage device of claim 10, wherein the plurality of storage elements are planes of at least one memory die.

13. The data storage device of claim 10, wherein an amount of time required to complete the operations on the first storage element to the n−1 storage element is substantially equivalent to an amount of time required to complete the first garbage collection operation on the nth storage element.

14. The data storage device of claim 10, wherein the nth storage element is identified as an idle storage element prior to the operations being executed on the first storage element to the n−1 storage element.

15. The data storage device of claim 10, wherein the operations are non-sequential operations.

16. A non-volatile storage device, comprising:
a controller means;
n number of memory dies, wherein n is greater than two;
means for providing a first set of operations to a first memory die of the n number of memory dies to a n−1 memory die of the n number of memory dies;
means for causing the first set of operations to be executed on the first memory die to the n−1 memory die;
means for causing a second set of operations to be executed on a nth memory die of the n number of memory dies while the first set of operations are being executed on the first memory die to the n−1 memory die, the second set of operations being different from the first set of operations;
means for causing the first set of operations to be executed on the nth memory die to a n−2 memory die of the n number of memory dies upon completion of the second set of operations being executed on the nth memory die; and
means for causing a third set of operations to be executed on the n−1 memory die while the first set of operations are being executed on the nth memory die to the n−2 memory die.

17. The non-volatile storage device of claim 16, wherein the n number of memory dies has a specified programming order from the first memory die to the nth memory die.

18. The non-volatile storage device of claim 16, wherein the second set of operations and the third set of operations are associated with garbage collection operations.

19. The non-volatile storage device of claim 16, wherein the nth memory die is identified as being idle during the first set of operations.

20. The non-volatile storage device of claim 16, wherein the first set of operations are non-sequential operations.

* * * * *